(12) United States Patent
Fomin

(10) Patent No.: US 10,551,945 B2
(45) Date of Patent: Feb. 4, 2020

(54) TOUCH SLIDER-POSITION SENSING

(71) Applicant: TEXAS INSTRUMENTS INCORPORATED, Dallas, TX (US)

(72) Inventor: Evgeny Fomin, San Carlos, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 15/911,067

(22) Filed: Mar. 2, 2018

(65) Prior Publication Data
US 2019/0042053 A1 Feb. 7, 2019

Related U.S. Application Data

(60) Provisional application No. 62/466,366, filed on Mar. 2, 2017.

(51) Int. Cl.
G06F 3/041 (2006.01)
G06F 3/044 (2006.01)
G06F 3/0362 (2013.01)
G06F 3/0354 (2013.01)

(52) U.S. Cl.
CPC .......... *G06F 3/0362* (2013.01); *G06F 3/0418* (2013.01); *G06F 3/03547* (2013.01); *G06F 3/03548* (2013.01); *G06F 3/044* (2013.01)

(58) Field of Classification Search
CPC ............. G06F 3/03547; G06F 3/03548; G06F 3/0362; G06F 3/041; G06F 3/0414; G06F 3/0416; G06F 3/044; G06F 3/04845; G06F 3/04847; G06F 3/0418; G06F 3/0487; G06F 3/017; H03K 17/955; B60K 2350/1052; B60K 37/06
See application file for complete search history.

(56) References Cited

U.S. PATENT DOCUMENTS

| | | | | |
|---|---|---|---|---|
| 8,493,354 B1* | 7/2013 | Birnbaum | ............... | G06F 3/016 345/173 |
| 2003/0214485 A1* | 11/2003 | Roberts | ................. | G06F 3/0414 345/173 |
| 2004/0252109 A1* | 12/2004 | Trent, Jr. | ............ | G06F 3/03547 345/174 |
| 2009/0184920 A1* | 7/2009 | Francis | ............... | G06F 3/03547 345/156 |
| 2010/0177042 A1* | 7/2010 | Chen | ................... | G06F 3/03547 345/159 |

(Continued)

Primary Examiner — Darlene M Ritchie
(74) Attorney, Agent, or Firm — John R. Pessetto; Charles A. Brill; Frank D. Cimino

(57) ABSTRACT

Touch slider-position sensing useable with a capacitive touch sensor that includes multiple capacitive electrodes arranged to define a slider track. The touch slider-position sensing methodology includes: (a) generating a set of calibration vectors for points of the slider track; (b) determining a touch slider-position based on (i) measuring a measurement/data vector associated with the touch-press slider-location, (ii) determining an angle between the measurement/data vector and a subset of the calibration vectors, and (iii) determining touch slider-position based on the angles between the measurement data vectors and the subset of calibration vectors. The method can include performing a quadratic or higher order interpolation of the angles between the measurement/data vector and the subset of the calibration vectors.

11 Claims, 4 Drawing Sheets

(56) References Cited

U.S. PATENT DOCUMENTS

| | | | | |
|---|---|---|---|---|
| 2011/0260970 | A1* | 10/2011 | Kuo | G06F 3/0488 |
| | | | | 345/161 |
| 2012/0154273 | A1* | 6/2012 | McDade, Sr. | G06F 3/0338 |
| | | | | 345/157 |
| 2013/0141375 | A1* | 6/2013 | Ludwig | G06F 3/0488 |
| | | | | 345/173 |
| 2014/0320434 | A1* | 10/2014 | Pantel | G06F 3/017 |
| | | | | 345/173 |
| 2015/0062075 | A1* | 3/2015 | Wakuda | G06F 3/044 |
| | | | | 345/174 |
| 2015/0097809 | A1* | 4/2015 | Heim | G06F 3/0416 |
| | | | | 345/174 |
| 2016/0124568 | A1* | 5/2016 | Heim | G06F 3/04883 |
| | | | | 345/174 |
| 2016/0252985 | A1* | 9/2016 | Tsai | G06F 1/163 |
| | | | | 345/173 |
| 2016/0301817 | A1* | 10/2016 | Sasaki | G06F 3/0488 |
| 2017/0371470 | A1* | 12/2017 | Nathan | G06F 3/0414 |
| 2018/0032170 | A1* | 2/2018 | Shaik | G06F 3/044 |
| 2018/0089166 | A1* | 3/2018 | Meyer | G06F 17/276 |

\* cited by examiner

TOUCH SLIDER-POSITION SENSING

CROSS-REFERENCE TO RELATED APPLICATIONS

Priority is claimed under 37 CFR 1.78 and 35 USC 119(e) to U.S. Provisional Application 62/466,366, filed 2017 Mar. 2, which is incorporated by reference in its entirety.

BACKGROUND

Mobile/portable personal communications and computing devices can use touch (touch-on-surface) technology for input. For example, touch buttons and touch sliders can be integrated into a device case. Such touch input elements/apparatus are distinguished from, for example, capacitive touch buttons defined on a device display panel. These touch input elements/apparatus are commonly located on a case edge, but also can be located on a bezel area of the display surface, or on the back of the device case.

For such touch input elements (for example, sliders or buttons), touch sensing is used for touch sensing to detect, for example, touch-press (button) or a touch-position (slider). Touch sensing can be based on capacitive/inductive sensing of physical deflection/deformation of the touch surface, or capacitive human body (finger) touch/presence. Touch sensing technologies can be used with different touch surfaces, including metal (conductive), and glass/plastic (nonconductive), which depending on the application/technology can include a conductive coating.

Touch sensing technologies can be used to detect both XY touch position on a touch surface, and touch force, such as based on the amount of surface deflection, or a change in sensed human body capacitance as finger pressure expands a touch contact area.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for touch slider-position sensing based on calibration/touch vector processing.

According to aspects of the Disclosure, a touch slider-position sensing method is useable with a capacitive touch sensor that includes multiple capacitive electrodes arranged to define a slider track. The touch slider-position sensing methodology includes: (a) generating a set of calibration vectors for points of the slider track; (b) determining a touch slider-position based on (i) measuring a measurement/data vector associated with the touch-press slider-location, (ii) determining an angle between the measurement/data vector and a subset of the calibration vectors, and (iii) determining touch slider-position based on the angles between the measurement data vectors and the subset of calibration vectors.

In other aspects of the disclosure the touch slider-position methodology can include performing a quadratic or higher order interpolation of the angles between the measurement/data vector and the subset of the calibration vectors.

Other aspects and features of the invention claimed in this Patent Document will be apparent to those skilled in the art from the following Disclosure.

BRIEF DESCRIPTION OF THE DRAWINGS

FIG. 1A illustrates an example two channel configuration with two interdigitated sensor electrodes [12A, 12B]; and FIGS. 2A/2B illustrate an example four channel configuration with four interdigitated sensors configured from five electrodes [22A-22E], with end electrodes [22A and 22E] coupled in series as a single end-point sensor.

DETAILED DESCRIPTION

This Description and the Drawings constitute a Disclosure for touch slider-position sensing based on calibration/touch vector processing, including describing design examples (example implementations), and illustrating various technical features and advantages.

This Disclosure uses the following nomenclature. A "touch slider" is a linear position sensor for sensing touch position along a linear slider/track defined by touch-slider element integrated into a device.

In an example application, the touch slider-position sensing methodology according to the Disclosure based on calibration/touch vector processing can be used to implement a touch slider element integrated into the case of a mobile communications device, such as on an edge panel/wall of the case.

In brief overview, a method suitable for touch slider-position sensing with a capacitive touch sensor that includes multiple capacitive electrodes arranged to define a slider track, includes: (a) generating a set of calibration vectors for points of the slider track; (b) determining a touch slider-position based on (i) measuring a measurement/data vector associated with the touch-press slider-location, (ii) determining an angle between the measurement/data vector and a subset of the calibration vectors, and (iii) determining touch slider-position based on the angles between the measurement data vectors and the subset of calibration vectors. To improve resolution, the method can include performing a quadratic or higher order interpolation of the angles between the measurement/data vector and the subset of the calibration vectors.

Figure 1:
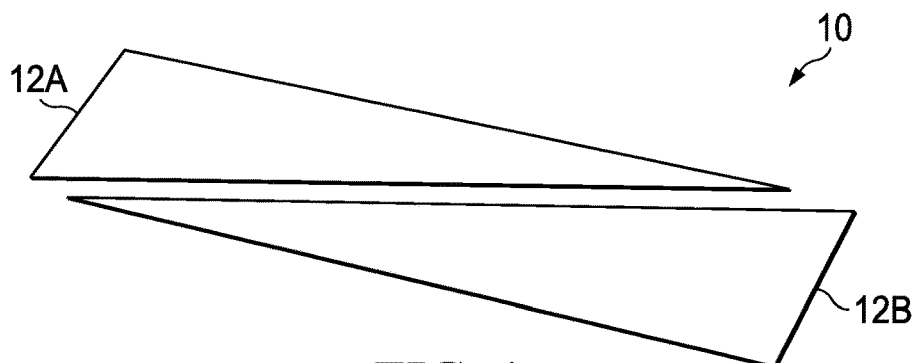
FIGS. 1 and 2A/2B illustrate example physical structures for a touch slider [10, 20] configured with multiple interdigitated touch sensors/electrodes, such as for implementing a touch slider element of a device case, with touch slider-position sensing according to this Disclosure.
Figure 2A:
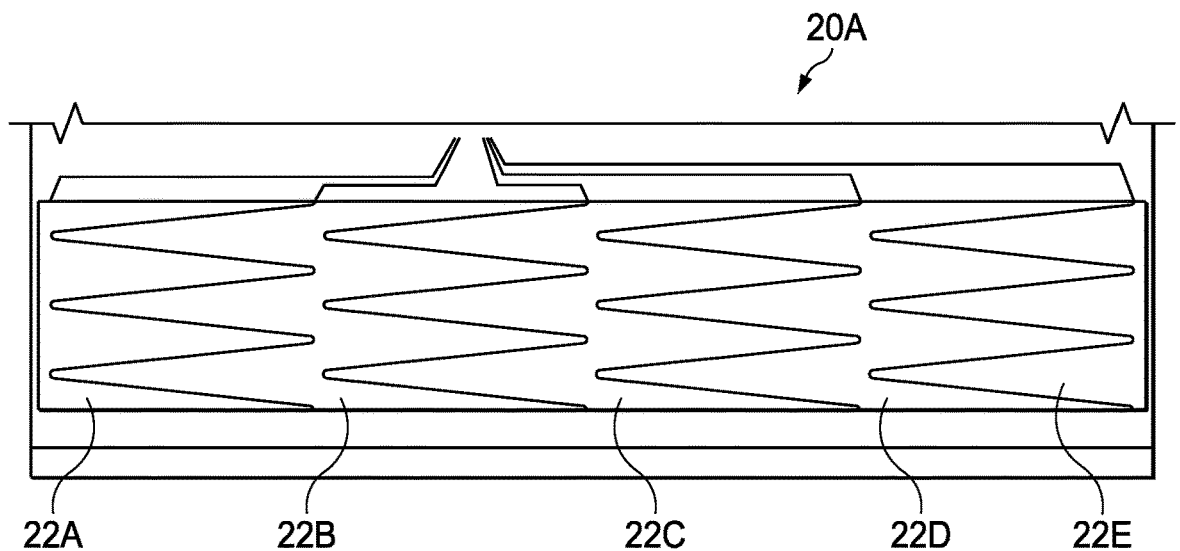
Figure 2B:
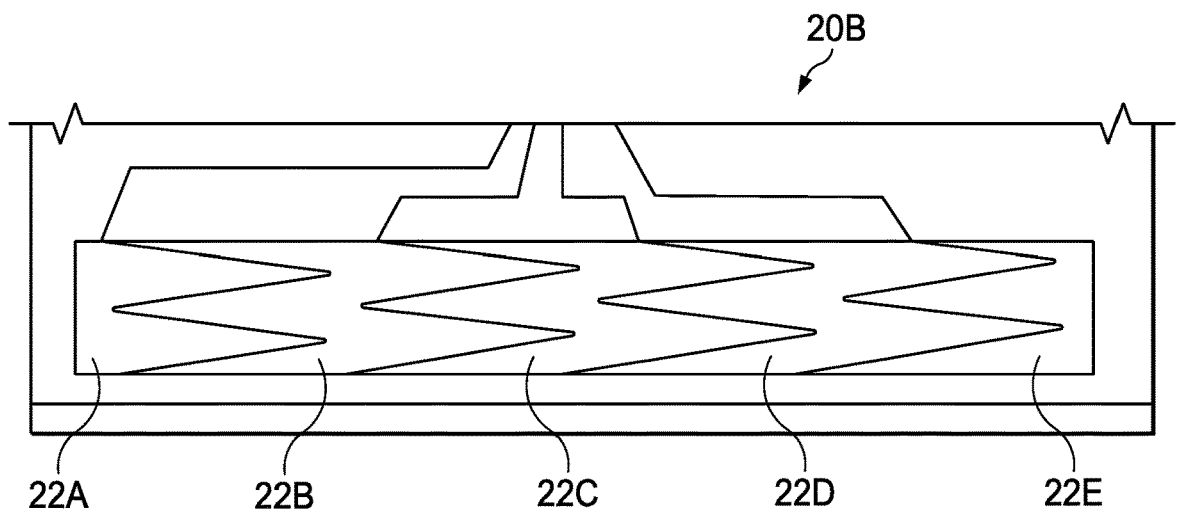

FIGS. 1 and 2A/2B illustrate example physical embodiments/structures for a capacitive touch slider, each with multiple capacitive interdigitated sensor electrodes, such as for implementing a touch slider element of a device case with touch slider-position sensing according to the Disclosure.

Touch slider position-sensing for sensing linear slider-position on a touch-slider according to the Disclosure, is based on calibration/touch vector processing, which is independent of sensor electrode configuration. In particular, touch slider position-sensing according to the Disclosure and can be scaled to different sensor electrode configurations, with different multi-electrode configurations and layouts, as required to achieve a desired performance/resolution for the touch slider.

FIG. 1 illustrates an example touch-slider sensor 10 in a two channel sensor configuration, with two interdigitated sensor electrodes 12A and 12B.

FIGS. 2A/2B illustrate (different views) an example four channel touch-slider sensor configuration 20A/20B, with four sensors configured from five interdigitated electrodes 22A-22E, with end electrodes 22A and 22E coupled in series as a single end-point sensor (this configuration is designated 22A/22E-22D).

An example touch slider implementation based on capacitive touch slider-position sensing according to the Disclosure, includes a touch slider sensor configuration with multiple capacitive sensor electrodes in a defined configuration/layout, and capacitive sensor electronics coupled to the each sensor electrode.

The design of the sensor electronics is not important to the touch slider-position sensing methodology, which is based on calibration/touch vector processing according to the Disclosure. For the example touch slider implementation based on capacitive touch slider-position sensing, a multi-channel capacitance-to-data converter (CDC) can be used, with each excitation/acquisition channel coupled to an associated slider sensor electrode (such as slider sensor electrodes 22A/22E-22D in FIG. 1B).

The following description of an example implementation of touch slider-position sensing based on calibration/touch vector processing according to the Disclosure is in the context of the example capacitive touch slider configuration of FIGS. 2A/2B, with four sensor channels (five interdigitated sensor electrodes 22A/22E-22D, where end point sensor electrodes 22A and 22E are series connected to provide a single end position sensor/channel). The example four channel touch slider sensor includes N=5 interdigitated sensor electrodes (five separate electrode sections/areas defining a linear slider/track).

During operation, capacitive data is collected from these N sensors to determine linear slider-position (X) of a finger, hand, or other capacitive object relative to the touch-slider element/track.

Figure 3A:
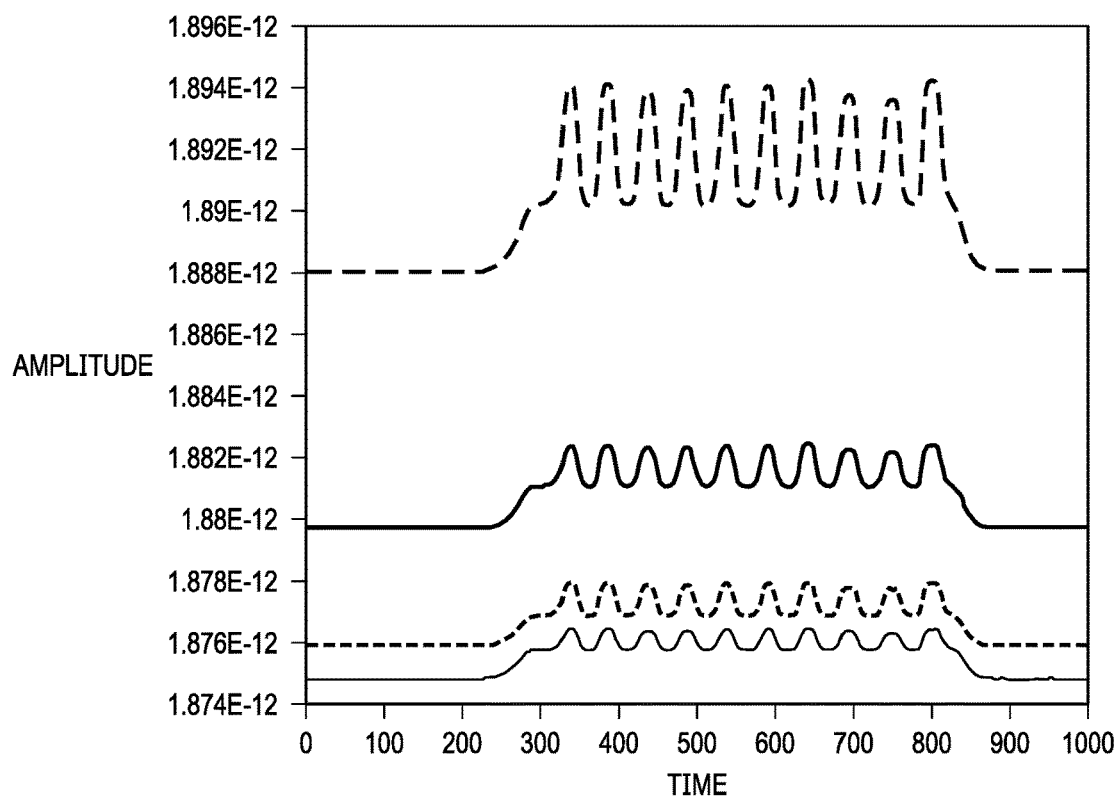
FIGS. 3A and 3B are an example plots illustrating calibration data collection for defining calibration vectors for use in touch slider-position sensing based on calibration/touch vector processing according to the Disclosure, for an example a touch slider with four touch sensors [FIGS. 2A/2B].
Figure 3B:
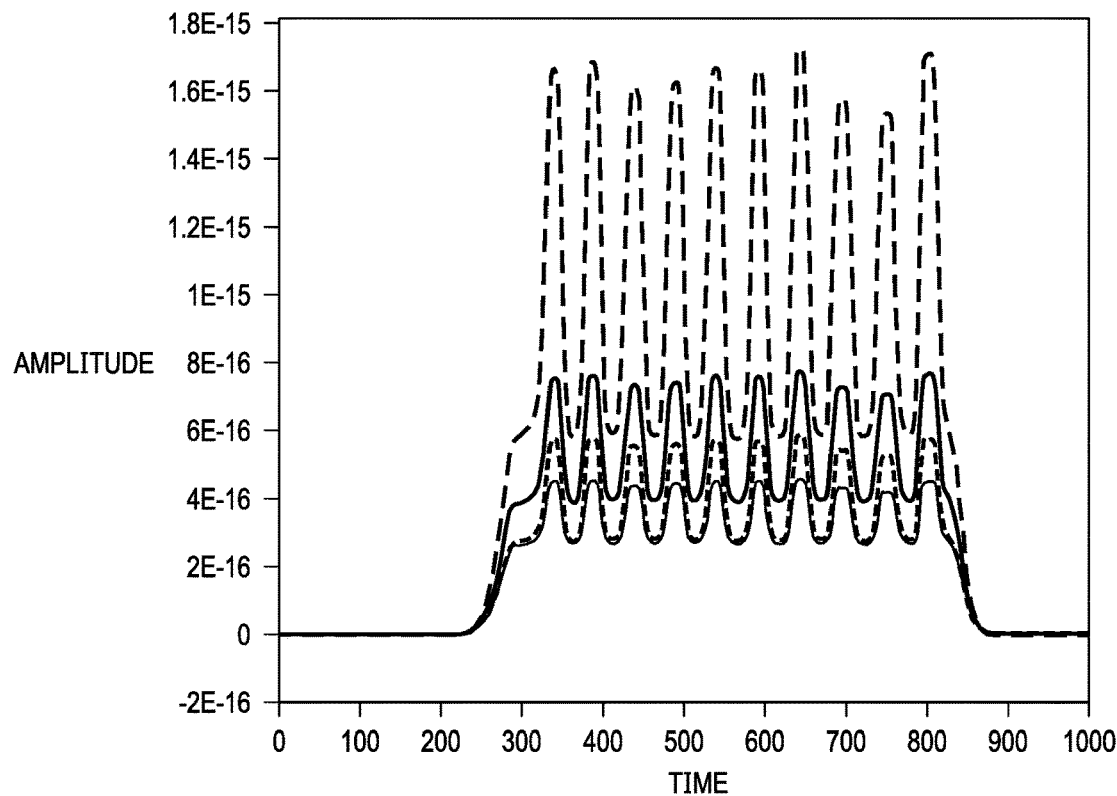

FIGS. 3A and 3B are an example plots illustrating calibration data collection for defining calibration vectors for use in touch slider-position sensing based on calibration/touch vector processing according to aspects of the Disclosure.

A initial calibration is performed, prior to touch slider operation, to collect calibration vector data. For example, calibration can be performed as follows.

Pre-determined positions on the slider are touched, and capacitive calibration data for each sensor electrode is measured. The example plots in FIGS. 3A/3B illustrate response averaging based on touching a slider-position 10 times.

Then the calibration data is post-processed to eliminate a DC component. For example, DC elimination can be based on removing a long-term moving average, or using a baseline tracking technique.

Then, a maximum delta-capacitance $\delta C$ response is determined for each of the four sensor electrodes.

Alternatively, a delta-capacitance response $\delta C$ can be measured as follows: (a) measure 0-level (no touch) capacitances of the N=5 sensor electrodes (22A/22E-22D in FIGS. 2A/2B); (b) measure capacitances for a touch-press at known slider-position X; and (c) then take the difference to derive delta-capacitance response $\delta C$.

This procedure is repeated at several known slider-positions X, for example, every 1 cm starting from end position 0 to end position L (for example, 10 cm) on the slider/track.

As a result, L+1 (for example, L=10 plus the zero position) sets of $\delta C$ responses are measured for each of the N sensor electrodes (22A/22E-22D in FIG. 1B) at the known X position. That is, L+1 response calibration vectors are determined, where each response calibration vector $\vec{R}$ is given by the $\delta C$ response as measured by the sensor channel for the associated sensor electrode, $\vec{R}(X)=(R_0, R_1, \ldots, R_N)$ where $R_i$ is a $\delta C$ response of each of the N sensor electrodes at position X.

Figure 4:
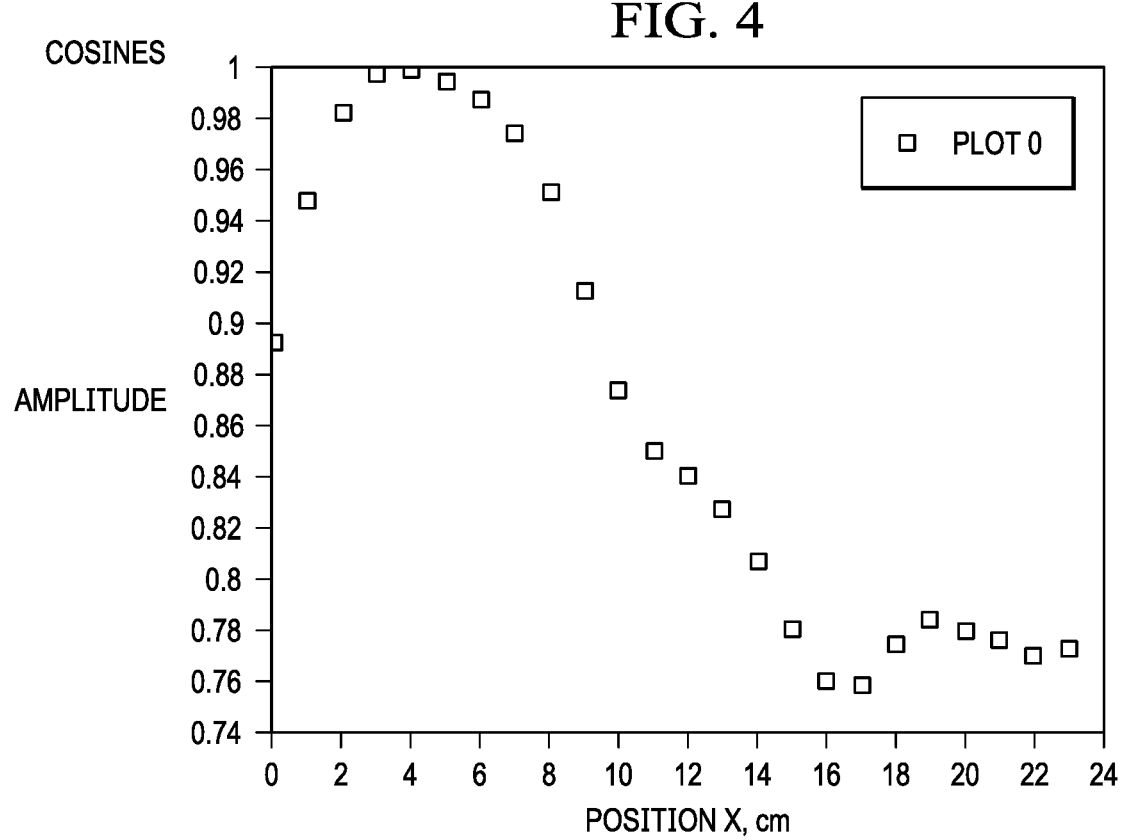
FIG. 4 is an example plot illustrating touch slider-position sensing based on calibration (R) and touch (D) vector processing according to aspects of the Disclosure.

FIG. 4 is an example plot illustrating touch slider-position sensing based on calibration/touch vector processing with calibration (R) and touch (D) vectors according to aspects of the Disclosure.

During touch slider operation, sensor data is continuously measured within pre-defined sensing periods (i.e., at a predefined sensing frequency). The DC component is subtracted from the data (for example, by removing long-term moving average, or using a baseline tracking technique). The remaining AC signal is a vector $\vec{D}=(D_0, D_1, \ldots, D_N)$, where $D_i$ is a capacitance $\delta C$ response of each sensor electrode. To determine if a touch-press is occurring, the touch slider-position sensing methodology calculates, in each sensing period, the length of data vector $$\vec{D}:|\vec{D}|=\sqrt{\Sigma_{i=0}^{N} D_i^2}$$

and compares it to a predefined threshold value T.

If the data vector magnitude D is greater than the threshold T, a touch-press is detected, and the methodology proceeds to determine touch slider-position.

Touch slider-position sensing according to the Disclosure is based on calibration/data vector processing. For each of the response calibration vectors $\vec{R}$, the cosine is determined between the measurement/data vector $\vec{D}$ and $\vec{R}$:

$$\cos(\alpha) = \frac{\sum_{i=0}^{N} R_i * Di}{|\vec{D}| * : |\vec{R}|},$$

where $|\vec{R}|$ is the length of the calibration vector:

$$|\vec{R}| = \sqrt{\sum_{i=0}^{N} R_i^2}$$

These determinations obtain $\cos(\alpha)$ as an angle between the measurement/data vector $\vec{D}$ and the calibration vector $\vec{R}$ associated with each of the calibration positions X.

FIG. 4 provides an example plot for this dependency, for an example slider 23 cm-long.

If the touch-press occurs at slider-position X, the current measurement/data vector will align well with calibration response vectors close to position X, i.e. the angle between measurement/data vector $\vec{D}$ and calibration vectors $\vec{R}$ will be close to 0, and cosine of the angles will be close to 1. The plot demonstrates this relationship for cosines around 4 cm are close to 1, indicating good alignment between current measurement/data vector and calibration vectors around X=4.

Figure 5A:
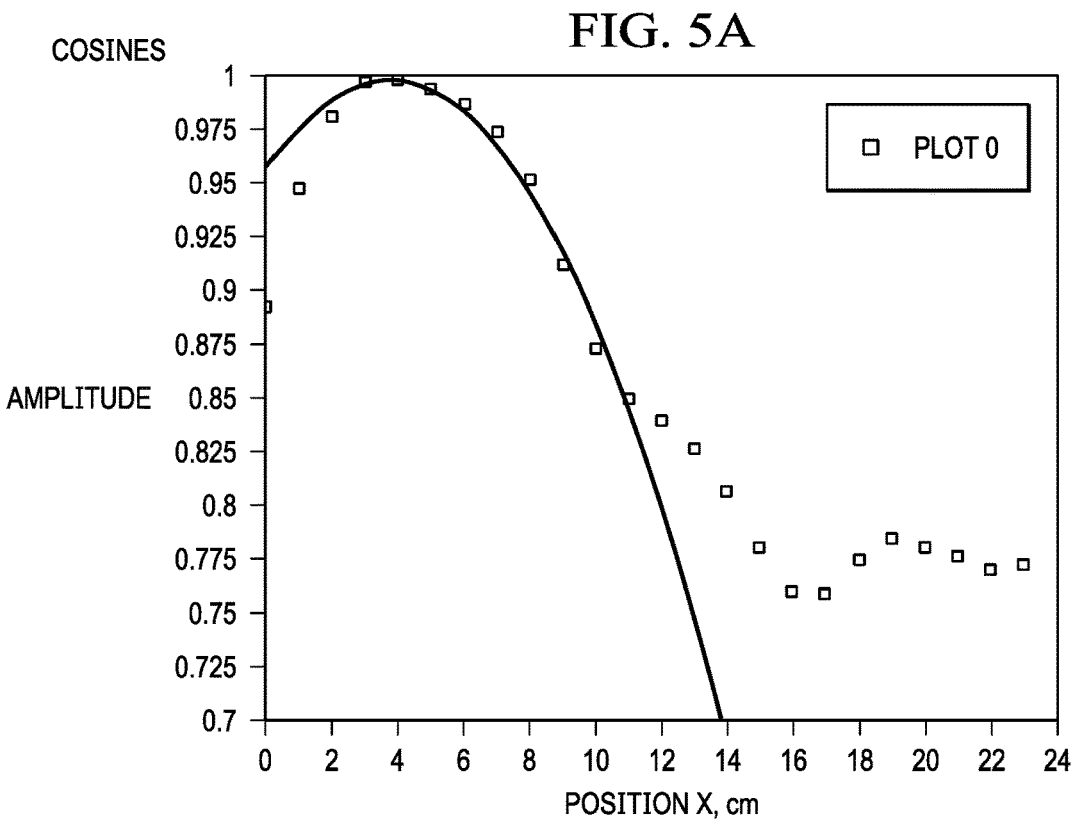
FIGS. 5A and 5B are example plots illustrating an aspect of touch slider-position sensing based on calibration/touch vector processing according to this Disclosure, using interpolation (in this example, quadratic) to identify a local maximum corresponding to touch slider-position.
Figure 5B:
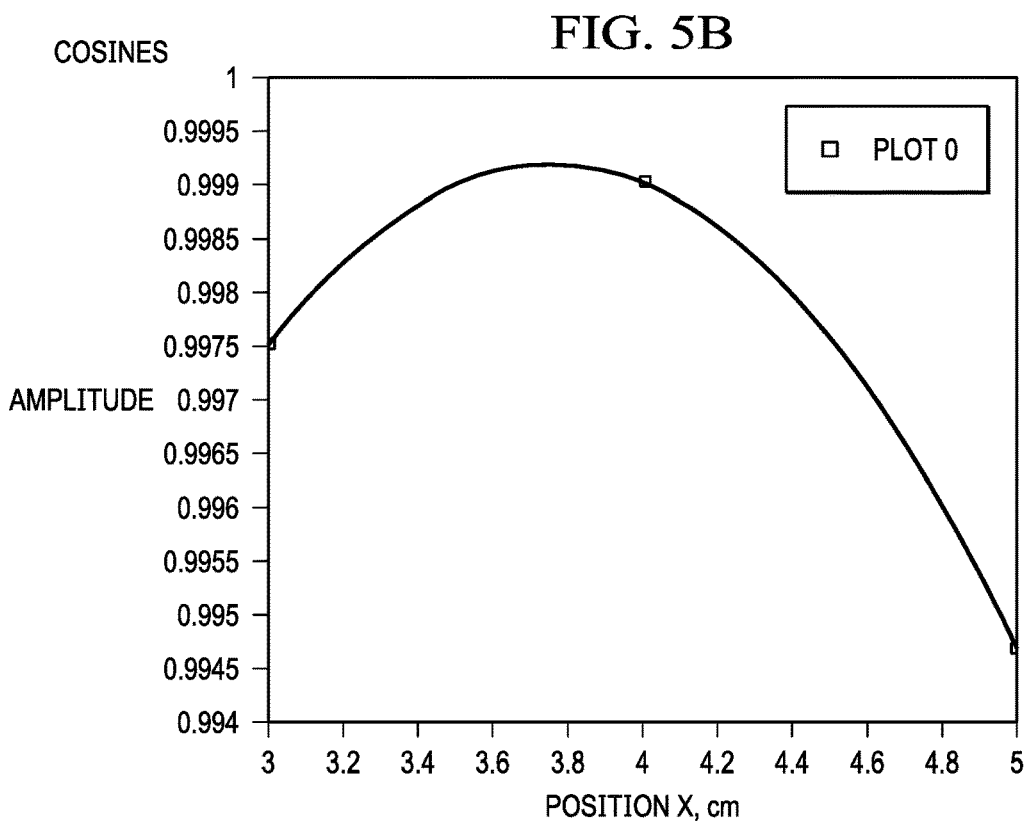

FIGS. 5A and 5B are example plots illustrating an aspect of touch slider-position sensing based on calibration/touch vector processing according to the Disclosure, using interpolation to identify a local maximum corresponding to touch slider-position. In this example, quadratic interpolation is used. Cubic or higher order interpolation can be used.

Resolution can be increased by using interpolation to determine a local maximum point for $\cos(\alpha)$ vs X. For example, to identify a touch slider-position, the methodology can proceed to identify a peak position for $\cos(\alpha)$ vs X. Points surrounding the maximum (X=4 in this example) are identified, and a quadratic interpolation is performed, using measurements at X=3, 4, and 5. For higher order interpolations, more surrounding points are used.

Using interpolation, a formula can be identified that gives a fit on the measurement/data points. A maximum of this function can be identified, around an initial measured maximum position, to find an interpolated maximum position with higher resolution (limited only by the noise in the measurement system). For example, in FIG. 5B, a touch position of X=3.7565 can be identified.

Note that the cosine did not go to 1, because of noise, so that the four dimensional vectors do not align exactly.

The Disclosure provided by this Description and the Figures sets forth example designs and applications illustrating aspects and features of the invention, and does not limit the scope of the invention, which is defined by the claims. Known circuits, connections, functions and operations are not described in detail to avoid obscuring the principles and features of the Disclosed example designs and applications. This Disclosure can be used by ordinarily skilled artisans as a basis for modifications, substitutions and alternatives, including adaptations for other applications.

The invention claimed is:

1. A method for touch-position sensing with a capacitive touch sensor that includes multiple capacitive electrodes arranged to define a slider track, comprising:
performing a calibration operation to measure calibration data at points along the slider track, and generating a corresponding set of calibration vectors $R(X)=(R_0, R_1, \ldots, R_N)$ for points of the slider track, where $R_i$ is a calibration data response of each capacitive electrode at the points along the slider track, and after the calibration operation, the calibration vectors corresponding to a configuration of the capacitive electrodes;
performing position sensing operations at a defined sensing frequency to determine a touch-position on the slider track based on:
measuring position data for the touch-position, and generating a corresponding touch-position vector $D=(D_0, D_1, \ldots, D_N)$, where $D_i$ is a position data response of each capacitive electrode at the touch-position,
determining an angle between the touch-position vector and each of a subset of the calibration vectors;
determining a touch-position based at least in part on the angles between the touch-position vectors and the subset of calibration vectors.

2. The method of claim 1, wherein the calibration operation comprises:
measuring, for each capacitive electrode, zero-level calibration data corresponding to no-touch;
measuring, for each capacitive electrode, touch calibration data at defined L positions on the slider track;
determining L+1 calibration vectors as a difference between the zero-level calibration data and the touch calibration data.

3. The method of claim 1, wherein the calibration operation comprises:
measuring, for each capacitive electrode, calibration data at defined L positions along the slider track;
generating L+1 calibration data sets, corresponding to the L positions and a zero position;
determining L+1 calibration vectors $R_i$ from the L+1 calibration data sets.

4. The method of claim 3, further comprising
post-processing each calibration data set to remove a DC component; and
generating, from the remaining AC calibration data, the corresponding calibration vector $R_j$.

5. The method of claim 3, wherein each calibration data set is based on averaging calibration data responses for multiple touches of each slider-position L.

6. The method of claim 5, wherein removing the DC component is based on removing a moving average of calibration data measurements.

7. The method of claim 1, further comprising
subtracting from the position data a DC component; and
generating, from the remaining AC position data, the corresponding touch-position vector $D_j$.

8. The method of claim 7, wherein removing a DC component is based on removing a moving average of position data measurements.

9. The method of claim 1, wherein the position sensing operations further comprise:
determining a length of the touch-position vector $D_j$, and
determining the touch-position based in part on a comparison of the length of the touch-position vector $D_i$ a with a defined threshold value.

10. The method of claim 9, further comprising determining the touch position based on:
determining the cosine between the position vector $[D_j]$ and the calibration vector $R_j$ according to $$\cos(\alpha) \frac{\sum_{i=0}^{N} R_i * D_i}{|\vec{D}| * : |\vec{R}|},$$

where $|\vec{R}|$ is the length of the calibration vector:

$$|\vec{R}| = \sqrt{\sum_{i=0}^{N} R_i^2}; \text{ and}$$

determining the touch position based on a local maxima of $\cos(\alpha)$.

11. The method of claim 10, further comprising:
performing a quadratic or higher order interpolation of the angles between the position vector and the subset of the calibration vectors.

* * * * *